Oct. 23, 1928.

W. W. HELLE 1,689,027

FISH BAIT

Filed Nov. 15, 1926

Inventor
Warren W. Helle
George E. Mueller Atty.

Patented Oct. 23, 1928.

1,689,027

UNITED STATES PATENT OFFICE.

WARREN W. HELLE, OF HINSDALE, ILLINOIS.

FISH BAIT.

Application filed November 15, 1926. Serial No. 148,532.

My invention relates to fish bait and has to do more particularly with an artificial fish bait of a weedless character, that is one which may be drawn through the weeds without being caught or without picking up the weeds as it is drawn through them.

An object of my invention is to provide an improved and simplified bait of the above character, one that is cheap to manufacture, simple in construction, positive in operation and at the same time adapted to readily hook into the fish when struck. Another feature of my invention is that the weedless element of the bait may be readily applied to the present well known spoon hook.

There are other features to my invention and these will be more particularly pointed out in the ensuing part of the specification and appended claims.

For a better understanding of my invention reference is to be had to the accompanying drawing, in which—

Figure 1:
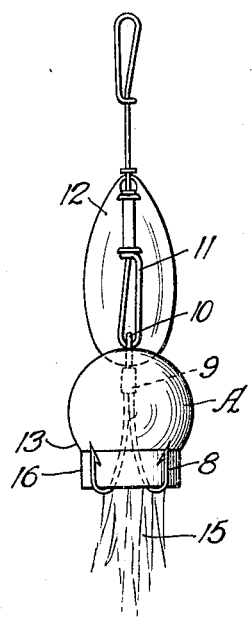
Fig. 1 is a side elevation of the preferred form of my invention.
Figure 2:
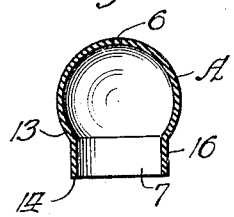
Fig. 2 is the bulb portion removed therefrom and shown in section.
Figure 3:
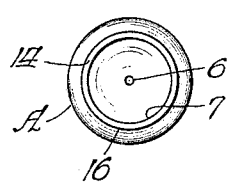
Fig. 3 is a bottom view of Fig. 2.

Referring now more in detail to the form of my invention as shown in Figs. 1 to 3, I provide a weed protecting element in the form of a bulb shaped body member A preferably made of a thin yielding material such as soft rubber. This body member A is tubular in shape, having a closed upper or forward end having a small opening 6 through which the hook or hook leader extends, while the bottom or rear end 7 is open so that the hooks and feather tail may extend therefrom. In this form of my invention I have shown the well known three-pronged hook comprising the three prong portions 8 which are radially disposed and extend from the central shaft portion 9. These hooks are ordinarily made up of three prong members secured together to form the shaft 9 with a loop 10 to which the leader 11 is secured and upon which the spoon 12 is supported. The three prong portions 8 of the hook extend outwardly through the opening 7 and then up and around against the outer peripheral surface of the bulb extending up to contact with the enlarging or outwardly extending wall portion 13. The parts are preferably so proportioned that the loop or bottom curved portion of the hook contacts with the edge 14 of the bulb sufficiently to prevent the point of the prong from entering the rubber bulb. Thus the bulb is symmetrically disposed upon the hook and the two parts centralized relative to each other. With the prongs of the hooks extending up substantially into contact with the bulging surface 13, it will be readily seen that the prong points are protected and prevented from coming in contact and hooking onto the weeds as the bait is drawn through the water. In the illustration I have shown a feather tail 15 extending rearwardly from the bait, the open ended bulb readily permitting this so that the bait is made more attractive.

The ordinary spoon hook as shown in Fig. 1 is a well known artificial bait and has been in constant use for many years because of its being so very effective. The principal objection to its use in certain water has been that it will become entangled in the weeds or will pull up the weeds as it is drawn through the water, requiring frequent cleaning. By the application of my improved protective device this objection has been overcome.

Thus as the bait is drawn through the water the tubular bulb member although sufficiently rigid to protect the hook points and prevent them from contacting with the weeds, is yieldable to such an extent that when the bait is struck by the fish this protective device will readily give or collapse so as to effectively expose the hook points and permit their hooking into the fish.

Figure 4:
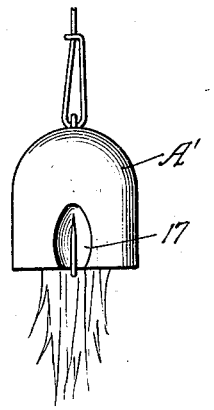
Fig. 4 is a side elevation of a modified form of my invention.
Figure 5:
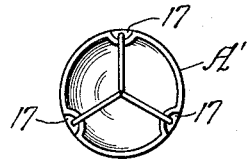
Fig. 5 is a bottom view of Fig. 4.

In the modified form of my invention as shown in Figs. 4 and 5 I also show a bulb-like tubular body member A', but instead of having it restricted like the body portion 16 of member A, I simply form depressions at 17 around the peripheral surface of the bulb so that the prongs of the hook will extend up into these depressions 17 and thereby be prevented from becoming entangled or contacting with the weeds. At the same time this member A' is also readily yieldable so that when struck it will collapse or give so as to effectively expose the hook points.

Thus in each case I have also provided a balanced symmetrical bait and the attachment in no way interfering with the effectiveness of the well known spoon hook. It is to be understood, however, that I contemplate applying it to other hooks than the one here illustrated, and therefore do not desire to be limited to the exact forms shown, but aim to cover all that which comes within the spirit and scope of the appended claims.

What I claim as new and desire to secure by United States Letters Patent is:—

1. An artificial bait comprising a jointed shaft with a loop on one end to receive a line, and a spoon secured adjacent said loop, a plurality of hooks secured to the second joint of said shaft the shanks of said hooks extending in the general direction of the shaft and extending symmetrically and radially outward to form hooks, and a thin walled rubber member having a section of spherical shape with an integral open ended tubular portion, the shaft extending through the center of the spherical portion, and the tubular portion resting on the curved portion of the hooks, the proportions being such that the spoon lies close to the rubber member but sufficiently above the same so as to spin freely without interference from said rubber member.

2. An artificial bait as defined in claim 1 wherein the rubber member is loosely placed on the shaft, the tubular portion resting on the curved portion of the hooks, and the point of the hooks extending up into close proximity to the spherical portion.

3. The bait defined in claim 1 with a feather tail secured to the shaft within the rubber member, the tail extending between the hooks and out through the opening in the tubular portion.

4. An artificial bait comprising a central shaft with a plurality of hooks projecting therefrom, and a collapsible member for protecting the hook points from entanglement with weeds, said collapsible member being of general spherical shape with a downwardly projecting tubular apron, the hook shaft extending through the center of the spherical portion and the tubular apron extending along the shank of the hooks, the hook points being close to but not in engagement with the outside walls of said spherical portion.

5. A weedless protecting element for artificial bait comprising an integral body of semi-soft rubber, the body having a spherical portion with a circular opening therein, and an apron of circular cross section projecting from the edge of the circular opening, a small aperture being provided in the spherical portion opposite said circular opening, for receiving the hook-bearing shaft of the artificial bait.

6. An artificial bait comprising a central shaft with a plurality of hooks projecting therefrom, and a collapsible member for protecting the hook points from entanglement with weeds, said collapsible member being of general spherical shape with a downwardly projecting tubular apron, the hook shaft extending through the center of the spherical portion and the tubular apron extending along the shank of the hooks, and the points of the hooks extending upwardly toward the spherical portion sufficiently to be protected thereby when being drawn through the weeds.

In witness whereof, I hereunto subscribe my name this 18th day of October, 1926.

WARREN W. HELLE.